United States Patent [19]
Abiko et al.

[11] Patent Number: 5,281,788
[45] Date of Patent: Jan. 25, 1994

[54] ELECTROEROSION BORING APPARATUS

[75] Inventors: Satoshi Abiko; Toru Onodera, both of Tamayama, Japan

[73] Assignee: Sodick Co., Ltd., Yokohama, Japan

[21] Appl. No.: 991,435

[22] Filed: Dec. 16, 1992

[30] Foreign Application Priority Data

Dec. 17, 1991 [JP] Japan .................. 3-361040

[51] Int. Cl.$^5$ .............. B23H 7/36; B23H 9/14
[52] U.S. Cl. ................ 219/69.14; 204/129.55
[58] Field of Search ........... 219/69.14, 69.11, 69.17, 219/69.2, 69.15; 204/224 M, 129.55, 129.6

[56] References Cited

U.S. PATENT DOCUMENTS

| | | | |
|---|---|---|---|
| 3,468,784 | 9/1969 | Joyce et al. | 204/224 |
| 4,289,947 | 9/1981 | Inoue | 219/69.14 |
| 4,393,292 | 7/1983 | Inoue | 219/69.14 |
| 4,705,932 | 11/1987 | Aso et al. | 219/69.14 |

FOREIGN PATENT DOCUMENTS

| | | | |
|---|---|---|---|
| 56-119333 | 9/1981 | Japan . | |
| 58-211831 | 12/1983 | Japan | 219/69.14 |
| 60-172423 | 9/1985 | Japan . | |
| 61-164731 | 7/1986 | Japan . | |
| 1-289616 | 11/1989 | Japan | 219/69.14 |
| 2-30421 | 1/1990 | Japan | 219/69.14 |
| 4-193423 | 7/1992 | Japan | 219/69.14 |
| 90/11159 | 10/1990 | PCT Int'l Appl. | 219/69.15 |

Primary Examiner—Geoffrey S. Evans
Attorney, Agent, or Firm—Marks & Murase

[57] ABSTRACT

An electroerosion boring method and apparatus for machining a small hole in a workpiece at high speed using a supplemental working fluid flushing means for directing working fluid toward a peripheral edge of the inlet-side opening of the hole being machined, and a working fluid supply means for supplying the working fluid to the jet nozzle means under pressure so that the working fluid at a pressure of at least 20 kg/cm$^2$ or more is directed from the supplemental flushing means. The supplemental high pressure flushing effectively prevents the machined chips from adhering to the peripheral edge of said hole without interfering with high-speed machining performance.

18 Claims, 3 Drawing Sheets

ELECTROEROSION BORING APPARATUS

FIELD OF THE INVENTION

The present invention relates to an electroerosion boring apparatus for forming relatively small holes in a workpiece at high speeds.

BACKGROUND OF THE INVENTION

In order to bore relatively small hole in a workpiece at high speed by means of electroerosion using electrical discharges, a relatively long tubular electrode of a few millimeters or less in diameter is widely used. A machining current having a high current density (e.g., 1000 A/cm$^2$ or more) is applied to the machining gap while the gap is flushed with a working fluid from the tubular electrode at a relatively high pressure (e.g., 20 kg/cm$^2$ or more). In this type of electroerosion boring apparatus, the workpiece can be machined at a relatively high feed rate (e.g., 20 mm/min or more) which is several to more than ten times as large as that of the usual die-sinking electric discharge machine when machining at a small wear rate of electrode. Due to such high speed machining performance, high speed electrical discharge machining is now widely applied for purposes other than small hole drilling, for example, for machining small-sized parts.

Japanese Patent Application Laid-Open No. 172423/1985 discloses an electrical discharge boring apparatus for attachment to a wire-cut electric discharge machine (EDM) using a tubular electrode through which a working fluid flows into a machining gap to produce a so-called initial hole for threading a wire electrode in a workpiece.

In electrical discharge hole boring operations, the workpiece material is removed by electrical discharges which repeatedly melt minute particles of metal from the workpiece. This removed metal forms chips when cooled by the machining fluid. These chips may adhere to the peripheral edge of the opening of a machined hole or depression and form a fused adhesive deposit, resulting in degradation of the finish quality of the workpiece. Therefore, the fused or sputtered chips have to be removed by additional operations, which are troublesome, particularly when machining small-sized parts.

It is well known that the build-up of the fused adhesive deposit is dependent on the discharge machining parameters. When boring a small hole or depression using a high feed rate and large machining energy, the build-up of the fused adhesive deposit is large in comparison to slower, lower-energy machining. If the discharge machining energy is lowered to reduce the build-up of the adhesive deposit, the high-speed performance, which is the greatest advantage of this type of electrical discharge boring, is lost.

Conventionally, as alluded to above, it was necessary to remove the fused adhesive deposit after the completion of the high-speed electrical discharge boring using other processes, thereby resulting in reduced machining efficiency and increased cost.

SUMMARY OF INVENTION

An object of the invention is to provide an improved electroerosion machining method and apparatus which realizes high-speed boring of a small hole in a workpiece, while effectively restraining the build-up of a fused adhesive material.

The object of the invention may be attained by providing an electroerosion method and apparatus for boring a small hole or depression in a workpiece in which the machining pulse voltage is repeatedly applied to a machining gap formed between the workpiece and tubular electrode, while a working fluid is supplied into the machining gap through said tubular electrode, and the predetermined relative feed motion of the tubular electrode is effected. A supplemental working fluid flushing means is used for directing working fluid at the peripheral edge of the inlet-side opening of the machined hole formed by said tubular electrode. A working fluid supply means for supplying the working fluid to the supplemental flushing means under pressure, so that the working fluid is flushed from said supplemental flushing means at a pressure of at least 20 kg/cm$^2$ or more, is also used.

Additional objects, advantages and novel features of the invention will be set forth in part in the description which follows and in part will become apparent to those skilled in the art upon examination of the following, or may be learned by practice of the invention. The objects and advantages of the invention may be realized and attained by means of the methods and structures as set forth in the appended claims.

BRIEF DESCRIPTION OF THE DRAWINGS

The accompanying drawings, which are incorporated in and form a part of the specification, illustrate the presently preferred embodiments of the invention and, together with the description which follows, serve to explain the principles of the invention. In the drawings.

DETAILED DESCRIPTION OF THE PREFERRED EMBODIMENTS

Reference will now be made in detail to the preferred embodiment of the invention, an example of which is illustrated in the accompanying drawings.

Figure 1:
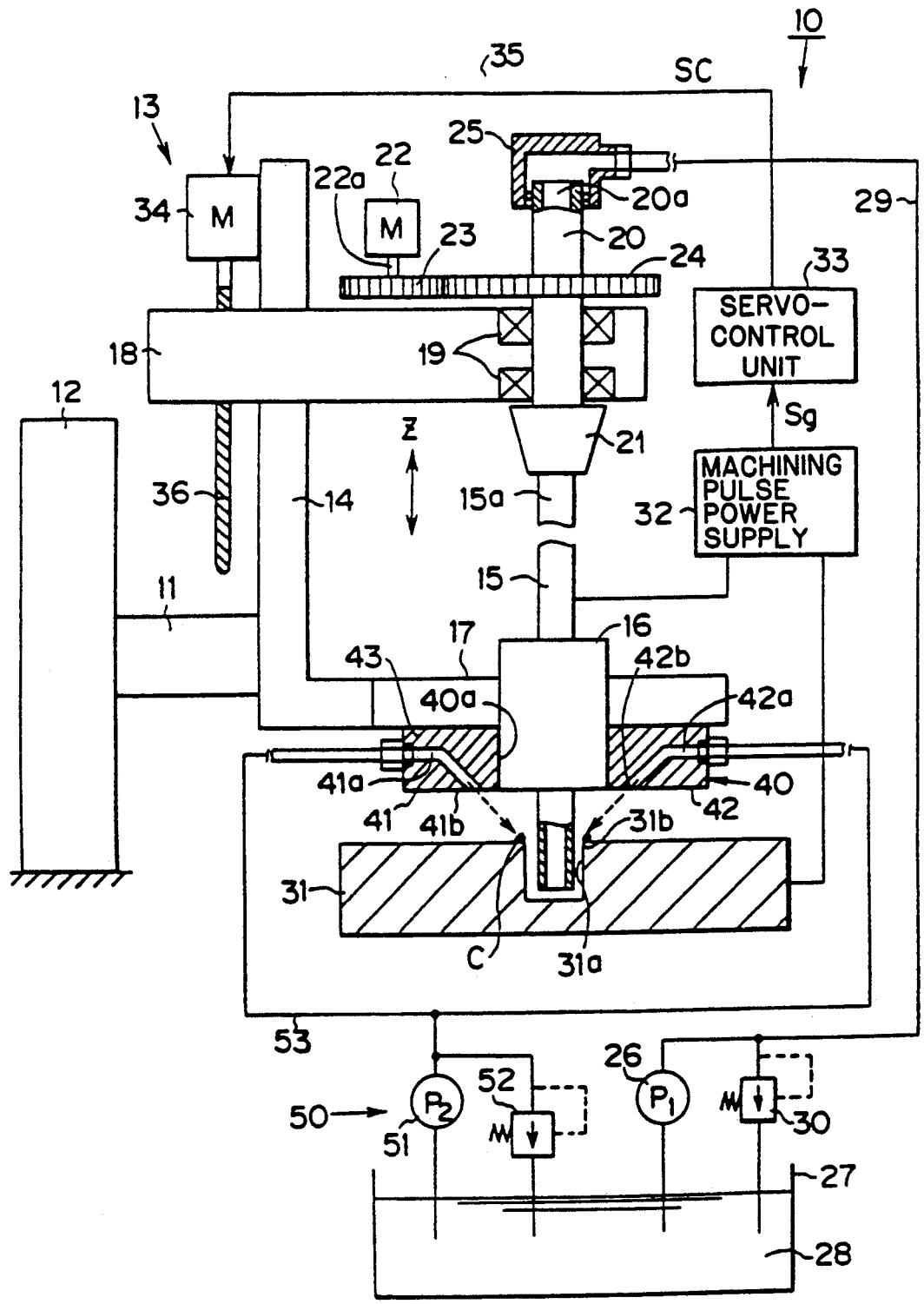
FIG. 1 is a schematic illustration of one embodiment of the electroerosion boring apparatus according to the invention.

FIG. 1 illustrates an embodiment of the invention including an electrical discharge boring apparatus 10 according to the invention. The electrical discharge boring apparatus 10 may include a head 13 fixedly disposed on a main frame 12 by a bracket 11.

The head 13 may advantageously by provided with an L-shaped guide frame 14 fixed to the bracket 11, and a conventional electrode guide 16 for guiding a tubular electrode 15. The tubular electrode 15 is fixed to one end of the guide frame 14 by a suitable means through a guide holder 17. A base end 15a of the tubular electrode 15 is gripped by a device such as a chuck 21 disposed at the lower end of a hollow spindle 20, which in turn is rotatably supported by bearings 19 provided in a movable arm 18. The movable arm 18 is guided by the guide frame 14 so that it can move along the Z axis, i.e., in the axial direction of the tubular electrode 15.

In order to rotate the tubular electrode 15 when it is gripped by the chuck 21, a spur gear 24, which engages a pinion 23, is mounted on the hollow spindle 20. The pinion 23 is fixedly secured on an output shaft 22a of a motor 22. The hollow spindle 20 is rotated by the motor 22.

Working fluid is supplied to the space 20a of the rotating hollow spindle 20 by means of a rotary joint 25, which is secured on the upper part of the hollow spindle 20. A working fluid 28 from a supply tank 27 is pressurized by a pump 26 to feed the working fluid into the rotary joint 25 through a feed pipe 29. In the chuck 21, the hollow spindle 20 and the tubular electrode 15 are jointed together so that the pressurized working fluid supplied to the hollow spindle 20 is fed into the hollow space of the tubular electrode 15, and then from the lower opening of the tubular electrode 15 into the working gap between the electrode and the workpiece 31. A relief valve 30 may be provided to protect the working fluid feeding system including the pump 26.

The workpiece 31 to be machined is fixed to a work table, not shown, by a suitable means. Machining voltage pulses are applied across a machining gap between the workpiece 31 and the tubular electrode 15 by means of a machining pulse power supply 32. An electrode feeding device 35, comprising a servo-control unit 33 (responsive to the working gap conditions) and a feed motor 34, is arranged to control the position of the electrode during machining in order to maintain an appropriate machining gap.

The feed motor 34 is coupled to a feed screw 36, which engages the movable arm 18 to form the electrode feed device 35. The feed motor 34 acts in response to a servo-control signal SC delivered from the servo-control unit 33 based on a signal Sg representative of a machining gap status. The signal Sg may be derived from the machining pulse power supply 32. The feed rate of the tubular electrode 15 is then controlled, and the machining gap is maintained at a suitable size during machining operations.

Further, according to the invention, the electroerosion boring apparatus 10 is provided with a supplemental working fluid flushing device 40 for restraining the build-up of a fused adhesive deposit of machined chips on the peripheral edge 31b of the opening of the machined hole 31a, which is formed in the workpiece. In this embodiment, the supplemental working fluid flushing device 40 is fixed to a guide holder 17 disposed around the electrode guide 16 by a suitable means, e.g., screws, and provided with first and second nozzles 41 and 42.

Figure 2:
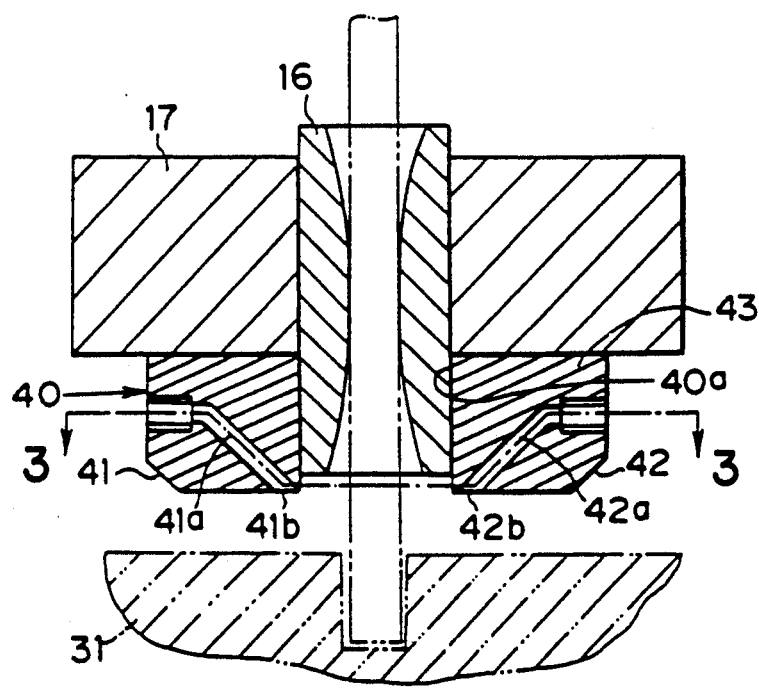
FIG. 2 is an enlarged fragmentary sectional view of a part of the electrical discharge boring apparatus shown in FIG. 1.
Figure 3:
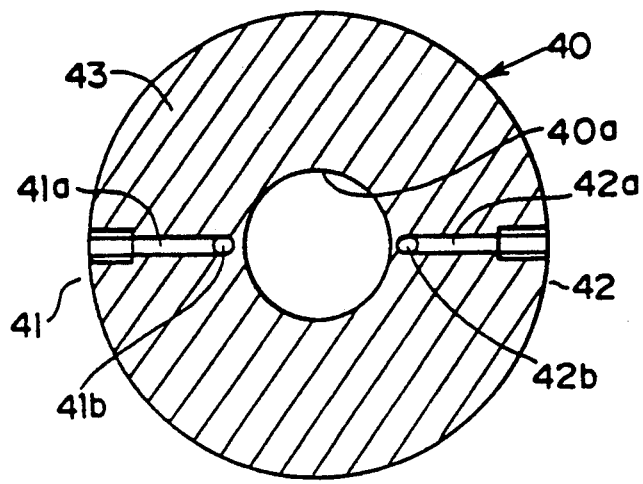
FIG. 3 is a cross-sectional view of the working fluid nozzle device through section 3—3 of FIG. 2.

FIGS. 2 and 3 depict the supplemental working fluid flushing device 40 in section. As will be apparent from a review of FIGS. 2 and 3, the illustrated embodiment of the supplemental working fluid flushing device 40 preferably has a body 43 formed as a thick-walled, hollow, cylindrical member with a hole 40a, into which the electrode guide 16 fits. First and second fluid delivery means 41 and 42 are formed in the body 43. These fluid delivery means may include passages 41a and 42a, which, in this example, are spaced 180° apart. Therefore, any forces the opposing fluid streams from the supplemental working fluid flushing device 40 may impart on the tubular electrode 15 are mutually cancelled, so that no net force will be created which may deform the tubular electrode 15.

The passage 41a of a first fluid delivery means 41 communicates at its entry end through a feed pipe 53 with a system 50 for supplying pressurized working fluid. The other end 41b of the passage 41a acts as a nozzle for discharging the pressurized working fluid. Similarly, the passage 42a of the second fluid delivery means 42 communicates at its entry end with the system 50 through the feed pipe 53, while the end 42b of the passage 42a acts as a nozzle for discharging working fluid. Preferably, the diameter of each of the nozzle end openings 41b and 42b is equal to or slightly larger than the diameter of the tubular electrode 15 so that the working fluid will cover the peripheral edge of the opening of the machined hole 31a. However, since the working fluid jet from the nozzle ends has a tendency to diffuse, the objects of the invention can be realized even with a nozzle having a slightly smaller diameter outlet.

In the illustrated embodiment, the ends 41b and 42b of the first and second fluid delivery means 41 and 42 are formed to create a jet of working fluid at an angle of about 45° to the axis of the electrode 15. However, this is by way of illustration only, and it will be appreciated that the angle of the jet of working fluid is not restricted to 45°, but can be any suitable value.

Figure 4:
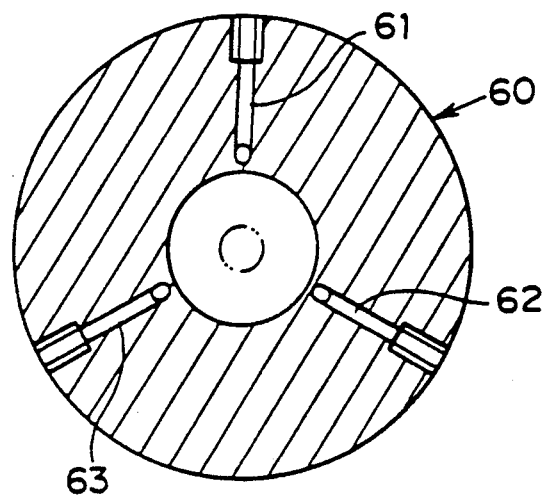
FIG. 4 is a cross-sectional view of an example of the working fluid nozzle device used for the electroerosion boring apparatus according to the invention.
Figure 5:
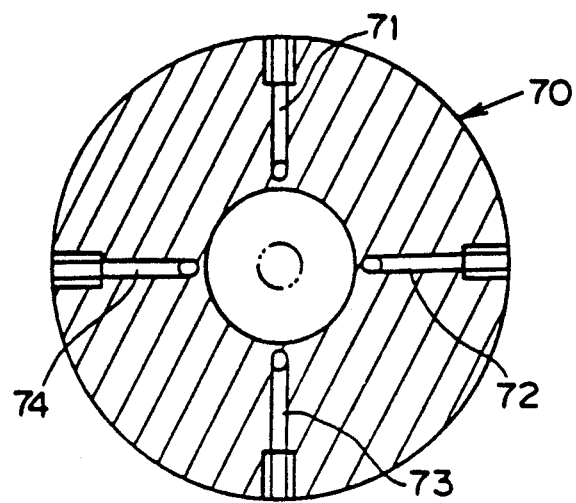
FIG. 5 is a cross-sectional view of another example of the working fluid nozzle device used for the electroerosion boring apparatus according to the invention.

The supplemental working fluid flushing means may direct more than two streams of high pressure at the periphery of the hole 31a. However, in order to prevent deformation of the tubular electrode 15, any forces on the tubular electrode 15 working fluid resulting from pressure applied by the supplemental working fluid device should be mutually cancelling. For example, as shown in FIG. 4, the supplemental working fluid flushing device 60 may be provided with three fluid delivery means 61, 62 and 63, each of the same basic structure as the structures 41 and 42 of the device 40 of FIGS. 2 and 3, but spaced at intervals of 120° about the axis of the electrode 15. Also, as shown in FIG. 5, a supplemental working fluid flushing device 70 may be provided with four fluid delivery means 71, 72, 73 and 74 equally spaced at intervals of 90° about the axis of the electrode 15. As will be apparent, almost any arrangement which provides equispaced nozzles disposed about the axis of the tubular electrode 15 may be used.

Returning now to FIG. 1, the system 50 for pressurizing and supplying the working fluid preferably comprises a pump 51 for pressurizing the working fluid 28 and the relief valve 52 connected in parallel to the pump 51. The pump 51 is preferably selected so that the supplemental flushing device will supply working fluid at a pressure of more than about 20 kg/cm$^2$ toward the peripheral edge 31b of the opening of the machined hole 31a from the individual nozzles, e.g., 41A and 41b.

According to the arrangement shown in FIG. 1, pressurized working fluid from the pump 26 is supplied from the tubular electrode 15 into the machining gap at the required pressure, and then electroerosion machining is carried out under conditions where working fluid is supplied to the machining gap and the distance between the electrode and workpiece is maintained at a suitable value by the electrode feeding device 35.

Machined chips which may result from electrical discharge machining are carried away from the machining gap by the working fluid supplied through the tubular electrode 15. In the case of high-speed machining, it is not feasible to completely remove all chips or metallic debris carried in the working fluid from the machining gap using only the working fluid from the tubular electrode 15. The working fluid from the tubular electrode 15 can scavenge the machined chips from the machined surface toward the opening 31b in the workpiece being machined. However, the ability of the working fluid to completely flush away all machining debris from the workpiece will abate as the fluid is forced to flow up through the gap between the machined hole 31a and the pipe electrode 15. As the hole or depression deepens, the ability of the working fluid to remove the machined chips, that is, the pressure and speed of the fluid, will decrease. As the hole deepens, chips will be more likely to adhere to the workpiece at or near the opening 31b. It is known that these chips, like their parent material, are magnetic. Therefore, when the workpiece is of a magnetic material, like iron, this magnetic force will also tend to cause adherence of chips to the workpiece. This is believed to be one of the mechanisms causing the build-up of the fused adhesive deposit. In the electrical discharge boring apparatus 10 of the present invention, the supplemental working fluid flushing device 40 applies working fluid at a high pressure to the peripheral edge 31b of the opening of the machined hole 31a so that chips which were carried away from the machining gap to the edge around the opening 31a are prevented from adhering to the workpiece. Moreover, as shown in FIG. 1, even if some of the fused adhesive material C builds on the peripheral edge 31b of the opening of the machined hole 31a, it is forced away from the workpiece by the pressurized working fluid from the supplemental working fluid nozzle device 40.

According to experiments, when a working fluid pressure of 20 kg/cm$^2$ at nozzle outlet of the device 40 was used, it was possible to prevent any significant deposit of chips. When a pressure of 40 kg/cm$^2$ was used, the adherence of chips was almost completely prevented. Therefore, it was recognized that a working fluid pressure of at least 20 kg/cm$^2$, and preferably 40 kg/cm$^2$ at the outlet of the nozzles of the supplemental flushing device, will prevent the build-up of fused adhesive deposit.

According to the present invention, there is provided a method and apparatus for preventing, or at least limiting, the build-up of the fused adhesive deposit previously experienced when machining relatively small holes by high-speed electrical discharge machining using a jet of pressurized working fluid and, therefore, a hole or depression can be machined into or through a workpiece without producing a build-up of a fused adhesive deposit at the periphery of the entry of the hole and without reducing the machining speed. Further, after the machining process is completed, no other process is required for removing the fused adhesive from the peripheral edge of the opening of the machined hole. Therefore, particularly with machining small-sized parts, a drastic time and cost reduction is realized.

We claim:

1. An electroerosion machining apparatus for machining a hole in a workpiece using a tubular electrode, said hole defining an inlet at a surface of said workpiece, said apparatus further comprising means for applying a machining pulse to a machining gap formed between the workpiece and said tubular electrode, means for supplying working fluid into the machining gap through said tubular electrode, and means for causing relative movement between the tubular electrode and the workpiece, said apparatus further comprising:

a supplemental working fluid flushing means for directing working fluid toward a periphery of said inlet; and a working fluid supply means for supplying working fluid to said supplemental flushing means under pressure so that working fluid at a pressure of at least about 20 kg/cm$^2$ is supplied to said supplemental flushing means.

2. The electroerosion apparatus according to claim 1, further comprising a second fluid supply means for supplying working fluid to said tubular electrode.

3. The electroerosion apparatus according to claim 2, wherein said second fluid supply means comprises a fluid pump and means for supplying fluid under pressure to said tubular electrode for flushing said machining gap.

4. The electroerosion apparatus according to claim 3, wherein said tubular electrode is rotatably mounted in said apparatus and said means for supplying fluid comprises a rotating joint for supplying pressurized fluid from said pump to an inlet end of said tubular electrode.

5. The electroerosion machine according to claim 1, further comprising a guide for movably guiding said tubular electrode during machining, and wherein said supplemental flushing means is mounted on said guide and comprises at least a pair of ducts terminating in fluid outlets, said ducts being spaced equidistantly about the axis of said tubular electrode and arranged to direct said working fluid at the periphery of said hole in the workpiece.

6. The electroerosion apparatus according to claim 1, wherein said supplemental flushing means comprises a body mounted coaxially about said tubular electrode, said body having at least two ducts spaced equidistantly about the axis of said electrode and arranged to produce jets of working fluid directed toward said hole in the workpiece and sized to envelope the periphery of said hole with working fluid.

7. The electroerosion apparatus according to claim 1, wherein said supplemental flushing means comprises at least two ducts arranged to direct working fluid towards said tubular electrode at a surface of said workpiece without causing any unbalanced forces to be exerted by said working fluid on said tubular electrode.

8. The apparatus according to claim 5, wherein said working fluid supply means provides fluid to said ducts at a pressure in the range of from about 20 kg/cm$^2$ to 40 kg/cm$^2$.

9. The apparatus according to claim 6, wherein said working fluid supply means provides fluid to said ducts at a pressure in the range of from about 20 kg/cm$^2$ to 40 kg/cm$^2$.

10. The apparatus according to claim 7, wherein said working fluid supply means provides fluid to said ducts at a pressure in the range of from about 20 kg/cm$^2$ to 40 kg/cm$^2$.

11. A method of minimizing build-up of fused adhesive/material during electroerosion machining of a workpiece electrode using a hollow, tubular electrode, wherein a machining gap is formed between the workpiece and the electrode, comprising the steps of:

applying machining pulses between the electrode and the workpiece;

passing working fluid under pressure through said hollow, tubular electrode and into said machining gap;

advancing the tubular electrode into the workpiece during machining to machine a hole;

supplying supplemental working fluid at a pressure of at least about 20 kg/cm²; and directing said supplemental working fluid at the periphery of said hole to flush away machined material from said machining gap.

12. The method according to claim 11, wherein said tubular electrode is rotatably mounted in an electroerosion machine, and wherein the step of passing working fluid further comprises the steps of supplying working fluid to a first end of said tubular electrode through a rotating joint using a working fluid supply means.

13. The method according to claim 12, wherein the step of supplying supplemental working fluid further comprises the step of using a second fluid supply means.

14. The method according to claim 11, where said tubular electrode has an axis and the step of directing supplemental working fluid further comprises the step of directing said working fluid from a plurality of nozzles equidistantly spaced about the axis of said tubular electrode.

15. The method according to claim 11, wherein said tubular electrode has an axis and the step of directing further comprises the step of directing said working fluid at the periphery of said hole from at least two ducts, wherein said ducts are positioned to minimize any net force transverse to the axis of said tubular electrode.

16. The method according to claim 11, wherein said step of supplying supplemental working fluid further comprises supplying said fluid at a pressure of from about 20 kg/cm² to 40 kg/cm².

17. The method according to claim 14, wherein said step of supplying supplemental working fluid further comprises supplying said fluid at a pressure of from about 20 kg/cm² to 40 kg/cm².

18. The method according to claim 15, wherein said step of supplying supplemental working fluid further comprises supplying said fluid at a pressure of from about 20 kg/cm² to 40 kg/cm².

* * * * *